(12) United States Patent
Diramio

(10) Patent No.: US 6,994,027 B1
(45) Date of Patent: Feb. 7, 2006

(54) DEVICE AND METHOD TO PREVENT MOVEMENT OF A PRINTING PLATE DURING CLAMPING

(75) Inventor: Angelo Diramio, Medford, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 11/071,431

(22) Filed: Mar. 3, 2005

(51) Int. Cl.
*B41F 27/12* (2006.01)

(52) U.S. Cl. .................... 101/409; 101/415.1; 271/277

(58) Field of Classification Search ............... 101/409, 101/415.1, 378, 401.1, 483; 347/262; 399/304; 271/277, 276, 204, 82, 85; 294/119.3; 198/835
See application file for complete search history.

(56) References Cited

U.S. PATENT DOCUMENTS 5,518,231 A * 5/1996 Reddy ........................ 271/277
6,412,413 B1 * 7/2002 Tice et al. ................... 101/409
6,705,226 B1 * 3/2004 McManus .................... 101/409
6,883,801 B2 * 4/2005 Fukui .......................... 271/277

* cited by examiner

*Primary Examiner*—Leslie J. Evanisko
(74) *Attorney, Agent, or Firm*—Robert A. Sabourin

(57) ABSTRACT

A device and method prevents movement of a printing plate during clamping of an end of the plate to an external drum of an imaging system using a clamping apparatus having: a clamping portion disposed on the external drum, wherein the clamping portion may be selectively displaced between a clamping position for clamping the leading edge of the printing plate against the external drum and a release position; and an inflatable member positioned between the clamping portion and the external drum for displacing the clamping portion between the clamping position and the release position. The device includes: a first spring-metal component mounted onto the external drum wherein the end of the plate can be positioned between one end of the first spring-metal component and the external drum, and the first spring-metal component is positioned between the clamping portion and the plate, to prevent the plate from moving during clamping.

2 Claims, 11 Drawing Sheets

DEVICE AND METHOD TO PREVENT MOVEMENT OF A PRINTING PLATE DURING CLAMPING

FIELD OF THE INVENTION

The present invention is in the field of pre-press imaging systems. A pre-press imaging system is a system that prepares and images a printing plate or film which is later used for transferring the images from the plate to another medium, such as paper, on a printing press. More particularly, the present invention provides an apparatus and method for clamping the edge or end of a printing plate on an external drum of a platesetter or platemaker in a pre-press imaging system.

BACKGROUND OF THE INVENTION

In external drum imaging systems, a movable optical carriage is commonly used to displace an image recording source in a slow scan direction while a cylindrical drum, with recording media mounted on an external surface thereof, is rotated along its longitudinal axis. The drum rotation causes the recording media to advance past the image recording source along a fast scan direction that is substantially perpendicular to the slow scan direction.

The image recording source may include an optical system for generating one or more imaging beams that are scanned across the surface of the recording media. Each imaging beam may be separately modulated according to a digital information signal representing data corresponding to the image to be recorded.

The recording media to be imaged by an external drum imaging system is commonly supplied in discrete, flexible sheets, hereinafter collectively referred to as "printing plates." Each printing plate may include one or more layers supported by a support substrate, which for many printing plates is a plano-graphic aluminum sheet. Other layers may include one or more image recording (i.e., "imageable") layers such as a photosensitive, radiation sensitive, or thermally sensitive layer, or other chemically or physically alterable layers. Printing plates that are supported by a polyester support substrate are also known and can be used in the present invention. Printing plates are available in a wide variety of sizes, typically ranging, e.g., from 9"×12", or smaller, to 58"×80", or larger.

Many clamping systems are available for holding an end or edge of a printing plate on the external drum of an imaging system (i.e. on the external surface of the drum). One example of a leading edge clamping mechanism is disclosed in U.S. Pat. No. 6,412,413 granted on Jul. 2, 2002 to Tice et al., herein incorporated by reference in its entirety for background information only. Although the leading edge clamping mechanism disclosed in this reference is highly effective, it has several drawbacks. For example, the leading edge clamping mechanism uses a fixed actuator to selectively open and close a clamping portion. As such, the clamping portion can only be opened and closed when it is positioned at a single circumferential position of the external drum (i.e., under the fixed actuator). Further, the leading edge clamping mechanism is a fairly complex mechanical assembly that has a high part count and is expensive to produce.

Another clamping mechanism is disclosed in U.S. Pat. No. 6,705,226 granted to McManus on Mar. 16, 2004, herein incorporated by reference in its entirety for background information only. A mechanism for clamping a leading end of a printing plate on an external drum of an imaging system includes: a clamping portion disposed on the external drum, wherein the clamping portion may be selectively displaced between a clamping position for clamping the leading end of the printing plate against the external drum and a release position; and an inflatable member positioned between the clamping portion and the external drum for displacing the clamping portion between the clamping position and the release position.

One major drawback of the '226 patent is movement of the printing plate during clamping. Specifically, when the bladder is deflated to cause the distal end of the clamping portion of the clamping apparatus to clamp down on the plate, the distal end moves slightly in a direction away from the registration pins, in turn causing the plate to move slightly in the direction away from the registration pins. This movement results in misalignment of the plate on the external drum.

SUMMARY OF THE INVENTION

The present invention provides an apparatus and method for preventing movement of a printing plate during clamping of an end or edge of the printing plate onto an external drum of a platesetter or platemaker in a pre-press imaging system.

A device and method prevents movement of a printing plate during clamping of an end of the plate to an external drum of an imaging system using a clamping apparatus having: a clamping portion disposed on the external drum, wherein the clamping portion may be selectively displaced between a clamping position for clamping the leading edge of the printing plate against the external drum and a release position; and an inflatable member positioned between the clamping portion and the external drum for displacing the spring segment between the clamping position and the release position. The device includes: a first spring-metal component mounted onto the external drum wherein the end of the plate can be positioned between one end of the first spring-metal component and the external drum, and the first spring-metal component is positioned between the clamping portion and the plate, to prevent the plate from moving during clamping.

BRIEF DESCRIPTION OF THE DRAWINGS

The features of the present invention are illustrated in detail in the accompanying drawings, wherein like reference numerals refer to like elements throughout the drawings. Although the drawings are intended to illustrate the present invention, the drawings are not necessarily drawn to scale.

DETAILED DESCRIPTION OF THE PREFERRED EMBODIMENTS

Figure 1:
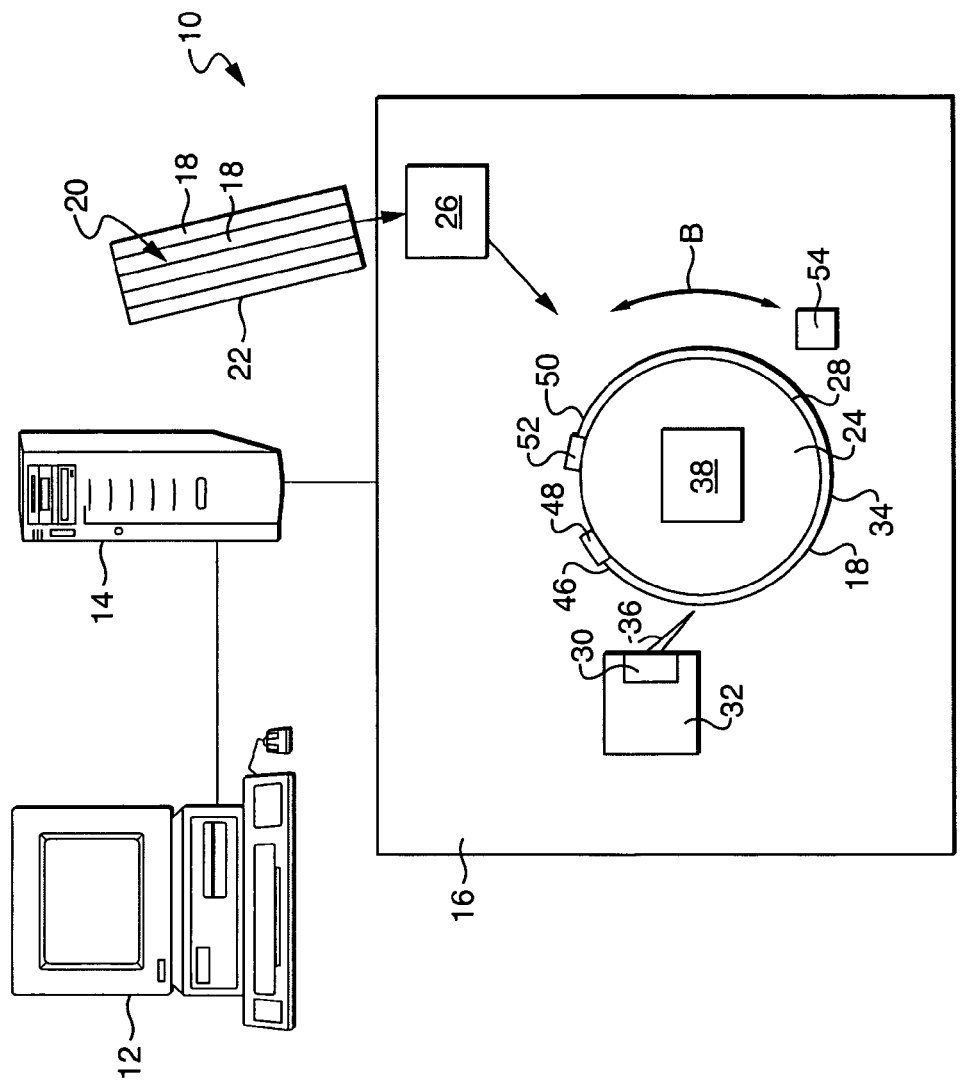
FIG. 1 illustrates an external drum imaging system for recording images onto a printing plate.

An example of an external drum imaging system 10 is illustrated in FIG. 1. The imaging system 10 includes an external drum platesetter configured to record digital data onto a printing plate 18. A similar clamping apparatus and method may be used in conjunction with a wide variety of other types of external drum, internal drum, or flatbed imaging systems, including imagesetters and the like. Further, the clamping apparatus and method may be used to clamp an unexposed printing plate on the plate cylinder of a printing press having an "on-press" imaging system.

The invention described herein is particularly useful for clamping a printing plate in the pre-press industry, however, in its broadest sense, the clamping apparatus and method of the present invention may be used to clamp a leading or a trailing end or edge of any sheet-like material to any type of cylindrical drum in any industry.

The imaging system 10 generally includes a front end computer or workstation 12 for the design, layout, editing, and/or processing of digital files representing pages to be printed, a raster image processor (RIP) 14 for processing the digital pages to provide rasterized page data (e.g., rasterized digital files) for driving an image recorder, and an image recorder or engine, such as an external drum platesetter 16, for recording the rasterized digital files onto a printing plate 18.

A stack 20 of printing plates 18 is commonly supplied in a cassette 22. A printing plate 18 is picked off of the top of the stack 20 and subsequently mounted on an external drum 24 of the external drum platesetter 16 by an autoloading system 26.

The external drum platesetter 16 includes an external drum 24 having a cylindrical media support surface 28 for supporting a printing plate 18 during imaging. The external drum platesetter 16 further includes a scanning system 30, coupled to a movable carriage 32, for recording digital data onto the imaging surface 34 of the printing plate 18 using a single or multiple imaging beams 36.

Figure 2:
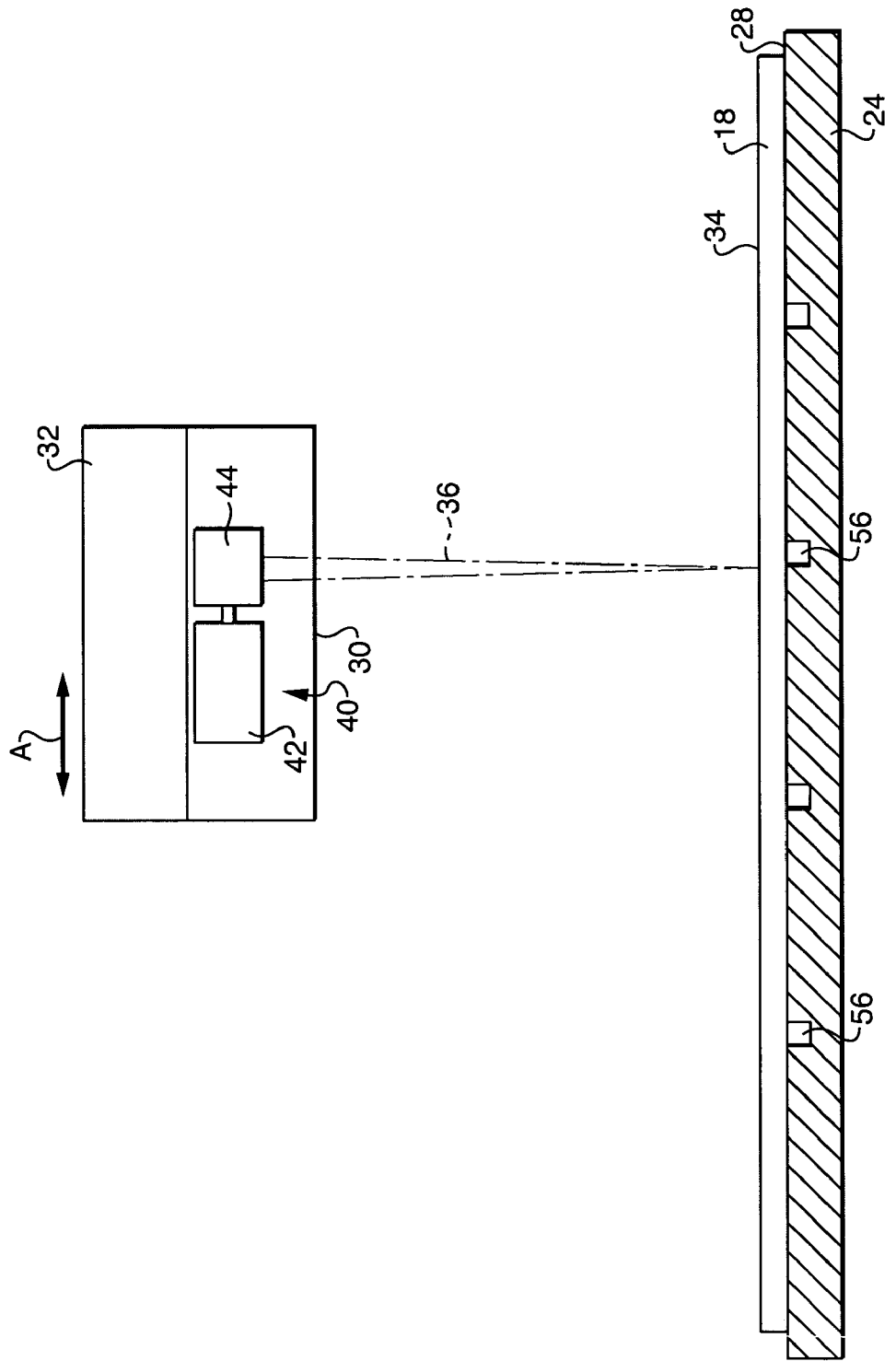
FIG. 2 illustrates an imaging system including a movable optical carriage and scanning system, usable in the external drum imaging system of FIG. 1.

An example of a scanning system 30 is illustrated in FIG. 2. In particular, the scanning system 30 is displaced by the movable carriage 32 in a slow scan axial direction (directional arrow A) along the length of the rotating external drum 24 to expose the printing plate 18 in a line-wise manner when a single beam is used or in a section-wise manner for multiple beams. Other types of imaging heads may also be used in the present invention.

The external drum 24 is rotated by a drive system 38 in a clockwise or counterclockwise direction as indicated by directional arrow B in FIG. 1. Typically, the drive system 38 rotates the external drum 24 at a rate of about 100–1000 rpm. As further illustrated in FIG. 2, the scanning system 30 includes a system 40 for generating the imaging beam or beams 36. The system 40 includes a light or radiation source 42 for producing the imaging beam or beams 36 (illustrated for simplicity as a single beam), and an optical system 44 positioned between the radiation source 42 and the media support surface 28 for focusing the imaging beam or beams 36 onto the printing plate 18. It should be noted, however, that the system 40 described above is only one of many possible different types of scanning systems that may be used to record image data on the printing plate 18.

In the external drum imaging system 10 shown in FIG. 1, the leading edge 46 of the printing plate 18 is held in position against the media support surface 28 of the external drum 24 by a leading edge clamping mechanism 48. Similarly, the trailing edge 50 of the printing plate 18 is held in position against the media support surface 28 of the external drum 24 by a trailing edge clamping mechanism 52. As detailed in U.S. Pat. No. 6,412,413, a vacuum clamping bar or magnetic clamps may be used to implement the trailing edge clamping system 52. Many other known systems may also be used to clamp the trailing edge 50 of printing plate 18 against the media support surface 28 of the external drum 24. The leading edge clamping mechanism 48 and the trailing edge clamping mechanism 52 both provide a tangential friction force between the printing plate 18 and the media support surface 28 of the external drum 24 that is sufficient to resist the tendency of the edges of the printing plate 18 to pull out of the clamping mechanisms 48, 52, at a high drum rotational speed.

A vacuum source 54 may be used to draw a vacuum through an arrangement of ports and vacuum grooves 56 (FIG. 2) to hold the printing plate 18 against the media support surface 28 of the external drum 24. The vacuum source 54 may also supply a vacuum to the autoloading system 26 that is configured to remove or "pick" the top printing plate 18 from the stack 20 of printing plates. A registration system including, for example, a set of registration pins on the external drum 24, and a plate edge detection system (not shown), may be used to accurately and repeatably position and locate each printing plate 18 on the external drum 24.

Figure 3:
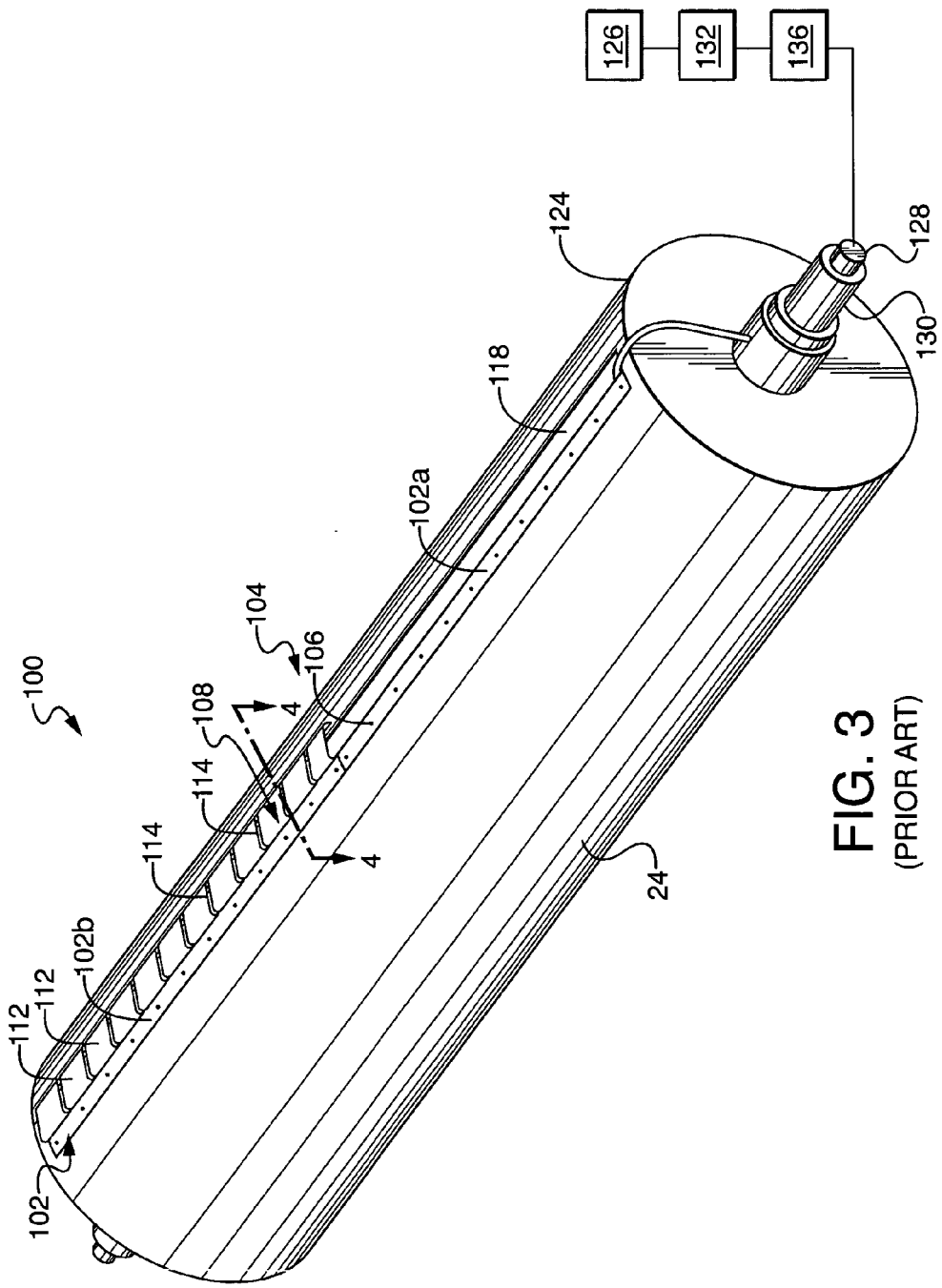
FIG. 3 is a perspective, partial, cut-away view of an external drum including a prior art leading edge printing plate clamping mechanism.

As shown in FIG. 3, a prior art leading edge clamping mechanism 100 is mounted on the external drum 24 and extends axially across a substantial portion of the width of the drum 24. The length of the leading edge clamping mechanism 100 is greater than the width of the largest printing plate 18 that may be imaged on the external drum 24. The specific location for the mounting of the leading edge clamping mechanism 100 on the external drum 24 is set using a fixture (not shown) attached to the external drum 24.

The clamping mechanism 100 includes a mounting portion 102 and a clamping portion 104. As shown in greater detail in FIGS. 4–6, the mounting portion 102 of the clamping mechanism 100 is secured to the external drum 24 using bolts 106 or other suitable mounting hardware. The mounting portion 102 may include one or more distinct sections (e.g., 102A, 102B, FIG. 3).

Figure 5:
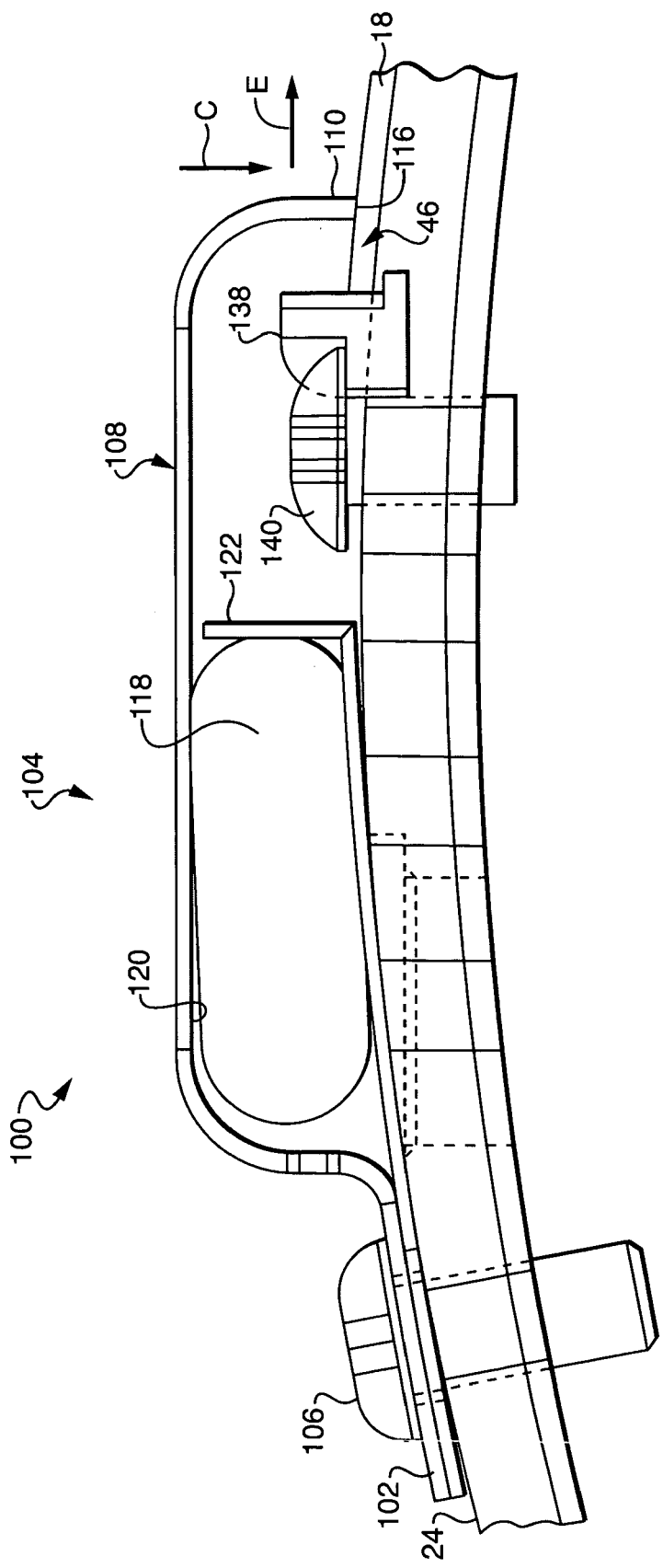
FIG. 5 is a cross-sectional side view of the prior art clamping mechanism of FIG. 3 in a plate clamping position.

The clamping portion 104 of the clamping mechanism 100 includes one or more spring segments 108. The spring segments 108 are formed using a lightweight spring steel or other suitable material. The use of a lightweight material lessens the possibility of distortion of the spring segments 108 due to centrifugal forces during imaging. When the clamping mechanism 100 is secured to the external drum 24, the distal end 110 of each spring segment 108 of the clamping portion 104 is biased against the surface of the external drum 24 as indicated by directional arrow C (FIG. 5). The biasing force provided by the spring segments 108 must be sufficient to hold the leading edge 46 of the printing plate 18 against the media support surface 28 of the external drum 24 as the external drum 24 is rotated at high speed during imaging. The magnitude of the biasing force is application specific and depends on many factors including the rotational speed of the external drum 24 during imaging, the type of printing plate 18 being imaged (e.g., aluminum or polyester substrate), etc.

Figure 4:
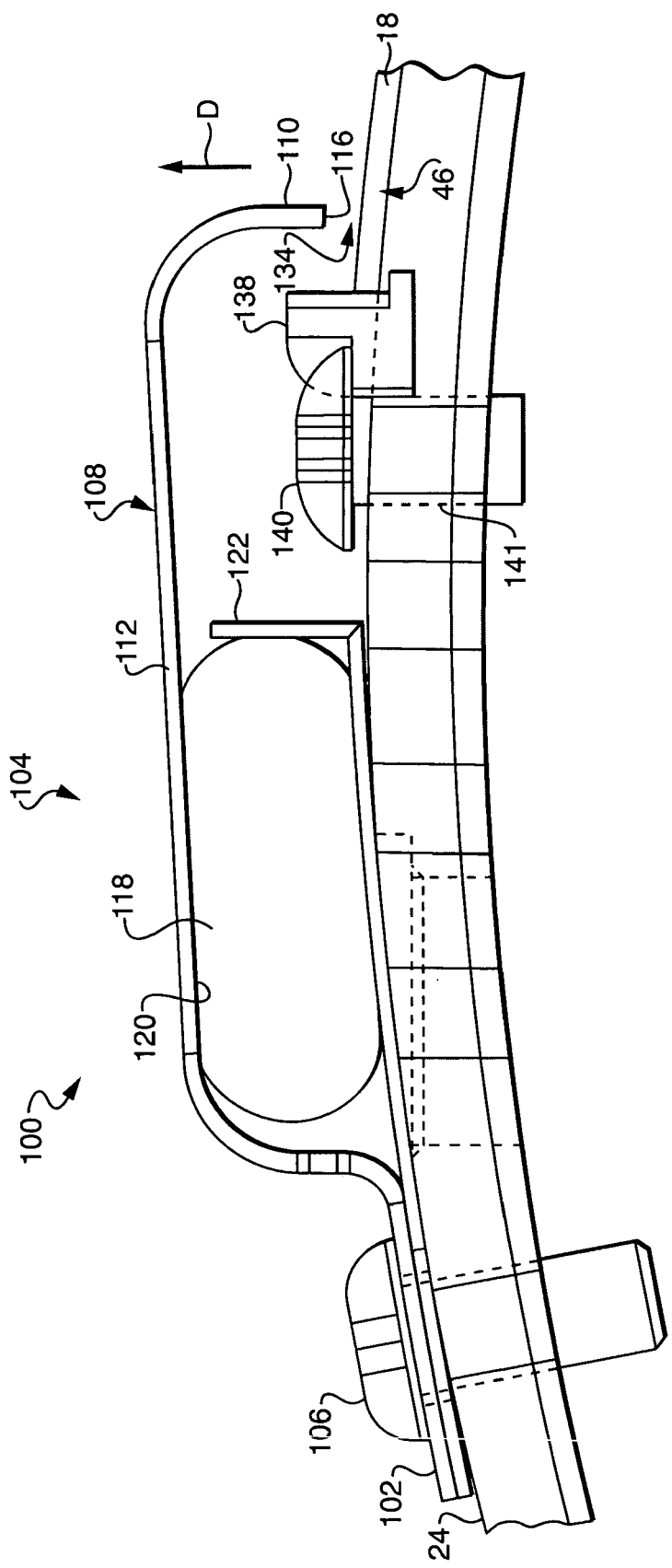
FIG. 4 is a cross-sectional side view of the prior art clamping mechanism of FIG. 3 in a plate release position.
Figure 6:
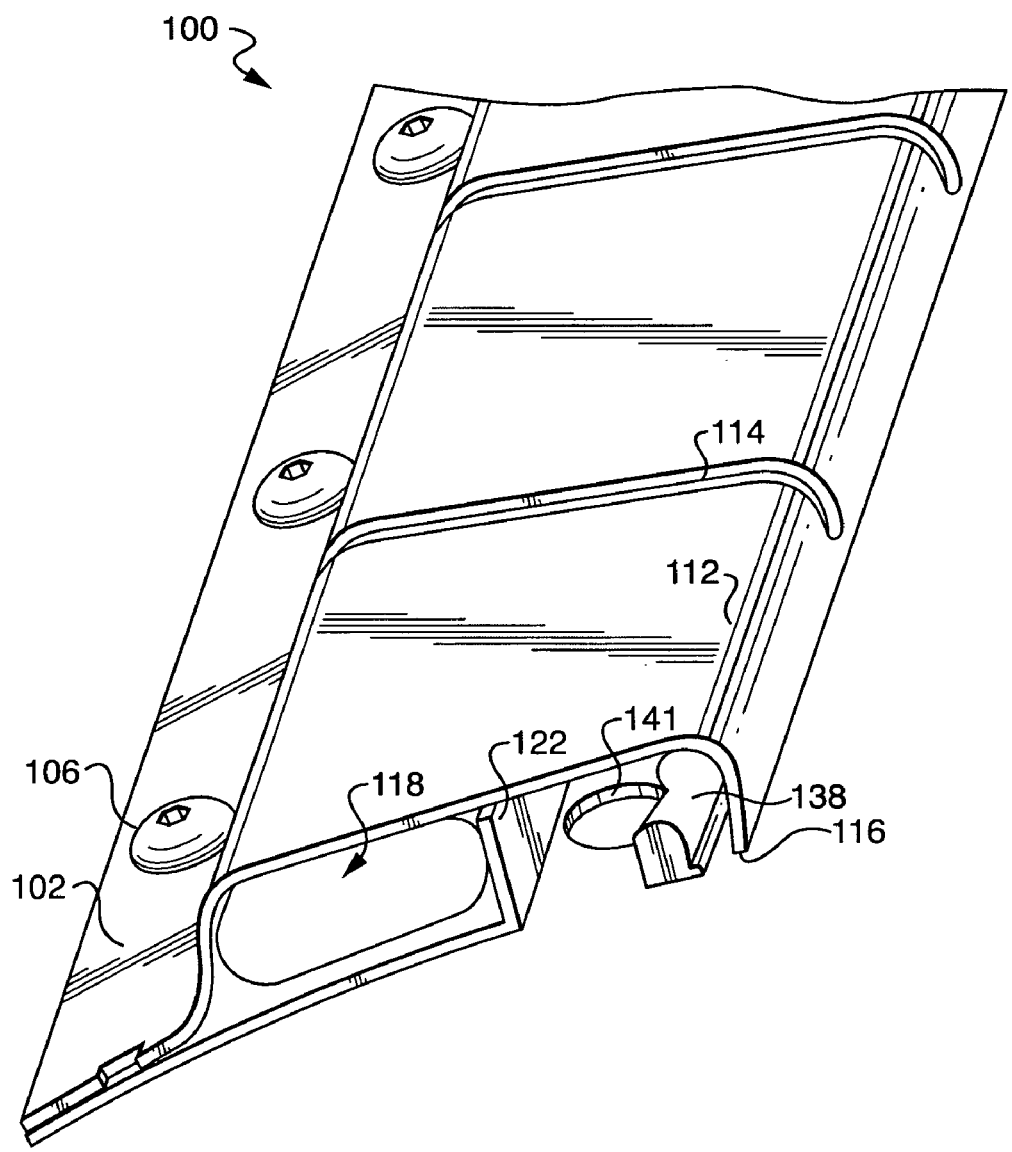
FIG. 6 is a perspective cross-sectional view of the prior art clamping mechanism of FIG. 3.

Each spring segment 108 of the clamping portion 104 of the clamping mechanism 100 may be formed as a single, continuous unit or may be configured to include a plurality of fingers 112. The fingers 112 may be provided by forming slots 114 in the spring segments 108. As shown in FIGS. 3 and 4, the slots 114 may extend to the edge 116 of the distal end 110 of the spring segments 108, in which case the plurality of fingers 112 operate independently of one another, or, as shown in FIG. 6, the slots 114 may extend partially through the distal end 110 of the spring segments 108. These types of finger arrangement may, depending upon the specific configuration of the spring segments 108, provide more uniform loading on the external drum 24.

The leading edge clamping mechanism 100 is actuated using a pneumatic bladder 118. The pneumatic bladder 118 may be formed from an elastomer such as EPDM, silicone, neoprene, etc. The pneumatic bladder 210 (FIG. 7) and inflatable seal clamp 304 (FIG. 8) described below may also be formed from similar elastomeric materials. The pneumatic bladder 118 extends under the spring segments 108 of the clamping portion 104 of the clamping mechanism 100, and is constrained between the external drum 24 and the underside 120 of the spring segments 108 by a support wall 122. Compressed air is provided via tube 124 (FIG. 3) to the pneumatic bladder 118 by a compressed air source 126 through a rotary coupling 128 in the shaft 130 of the external drum 24. A pressure relief valve 132 may be provided to prevent over-inflation of the pneumatic bladder 118.

As shown in FIG. 4, the pneumatic bladder 118 expands when it is supplied with compressed air from the compressed air source 126. Since lateral expansion of the pneumatic bladder 118 is limited by the support wall 122, the pneumatic bladder 118 necessarily expands toward the underside 120 of the spring segments 108. This forces the edge 116 of the distal end 110 of the spring segments 108 away from the surface of the external drum 24 as indicated by directional arrow D. This creates a space 134 through which the leading end 46 of a printing plate 18 may be inserted into, or removed from, the leading edge clamping mechanism 100. When the compressed air is released from the pneumatic bladder 118, the bladder 118 deflates and the edge 116 of the distal end 110 of the spring segments 108 is forced against the surface of the external drum 24. This clamps the leading edge 46 of printing plate 18 against the surface of the external drum 24 as shown in FIG. 5. The edge 116 of the distal end 110 of the spring segments 108 may be flat as shown or may be rounded. Other suitable shapes are also possible.

The distal end 110 of the clamping mechanism 100 tends to move in the direction E (FIG. 5) away from the registration pin 138 while engaging the plate 18, in turn, causing the plate 18 to shift or move slightly in the direction E. This results in the plate 18 being misaligned on the external drum 24.

In order to cause clamping, the compressed air may be released from the pneumatic bladder 118 using a valve 136 (e.g., a three-way solenoid valve) or other suitable air release system. A similar system may also be used to release air from the pneumatic bladder 210 and inflatable seal clamp 304 described below.

A plurality of registration pins 138 are mounted to the external drum 24 by bolts 140 or other suitable mounting hardware, and are positioned under the spring segments 108 between the support wall 122 and the distal end 110 of the segments 108. The registration pins 138 are used to accurately and repeatedly position (i.e., "register") the printing plate 18 on the external drum 24 for clamping and subsequent imaging. The bolts 140 pass through clearance or threaded holes 141 (FIG. 6) in the external drum 24.

Figure 7:
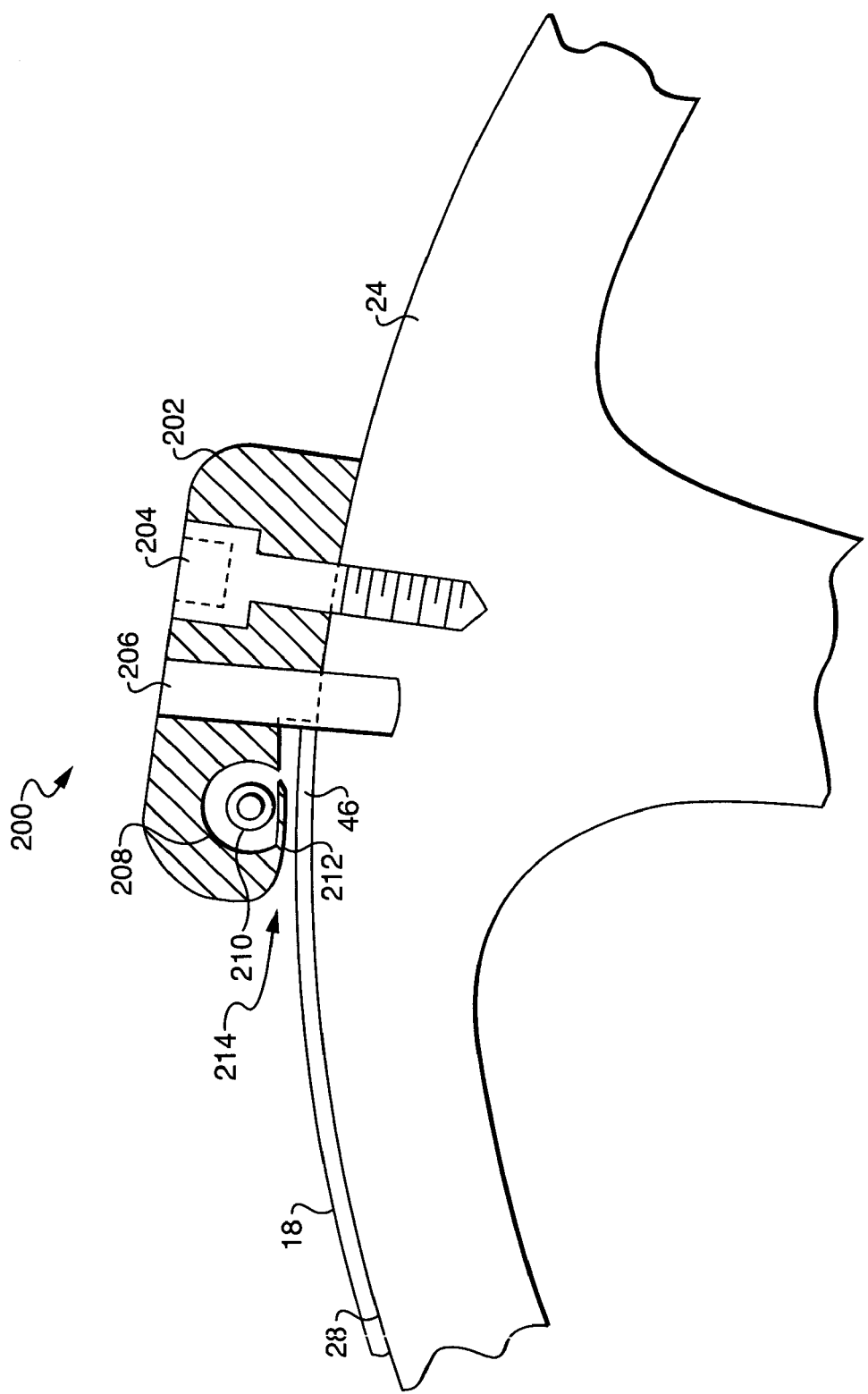
FIG. 7 is a cross-sectional side view of a second prior art clamping mechanism in a plate release position.

Another prior art embodiment of a clamping mechanism 200 is illustrated in FIG. 7. The leading edge clamping mechanism 200 includes a body 202 that is mounted to the external drum 24 using mounting hardware 204, and a plurality of registration pins 206 for registering a printing plate 18 on the external drum 24. Although shown in cross-section in FIG. 7, it should be realized that the leading edge clamping mechanism 200 extends across a substantial portion of the width of the external drum 24, much like the leading edge clamping mechanism 100 shown in FIG. 3.

The body 202 of the leading edge clamping mechanism 200 includes a channel 208 that contains and constrains a pneumatic bladder 210. A flexible shield 212, formed of plastic, metal, or other suitable material, is affixed to the body 202 adjacent the channel 208. When the pneumatic bladder 210 is not filled with compressed air, as shown in FIG. 7, the flexible shield 212 is in a retracted state, whereby the leading edge 46 of a printing plate 18 may be inserted into, or removed from, the mouth 214 of the leading edge clamping mechanism 200. It should also be noted that the flexible shield 212 helps to guide the leading edge 46 of the printing plate 18 into the mouth 214 of the leading edge clamping mechanism 200. When the pneumatic bladder 210 is inflated with compressed air (e.g., using a compressed air source 126, FIG. 3), the bladder 210 expands and forces the flexible shield 212 toward the external drum 24, clamping the leading edge 46 of the printing plate 18 against the surface of the external drum 24. Because a pneumatic bladder 210 is used to apply the clamping force against the printing plate 18, the leading edge clamping mechanism 200 self-adjusts for plate thickness.

The force applied against the leading edge 46 of the printing plate 18 by pneumatic bladder 210/flexible shield 212 must be sufficient to hold the leading edge 46 against the media support surface 28 of the external drum 24 as the external drum 24 is rotated at high speed during imaging. As described with regard to the leading edge clamping mechanism 100, the magnitude of this force is application specific.

The flexible shield 212 also protects the pneumatic bladder 210 from plate damage. In particular, the flexible shield 212 prevents the often sharp edges of the printing plate 18 from coming into contact with the pneumatic bladder 210. To this end, the dimensions of the flexible shield 212 are chosen to prevent any contact between the printing plate 18 and the pneumatic bladder 210.

Figure 8:
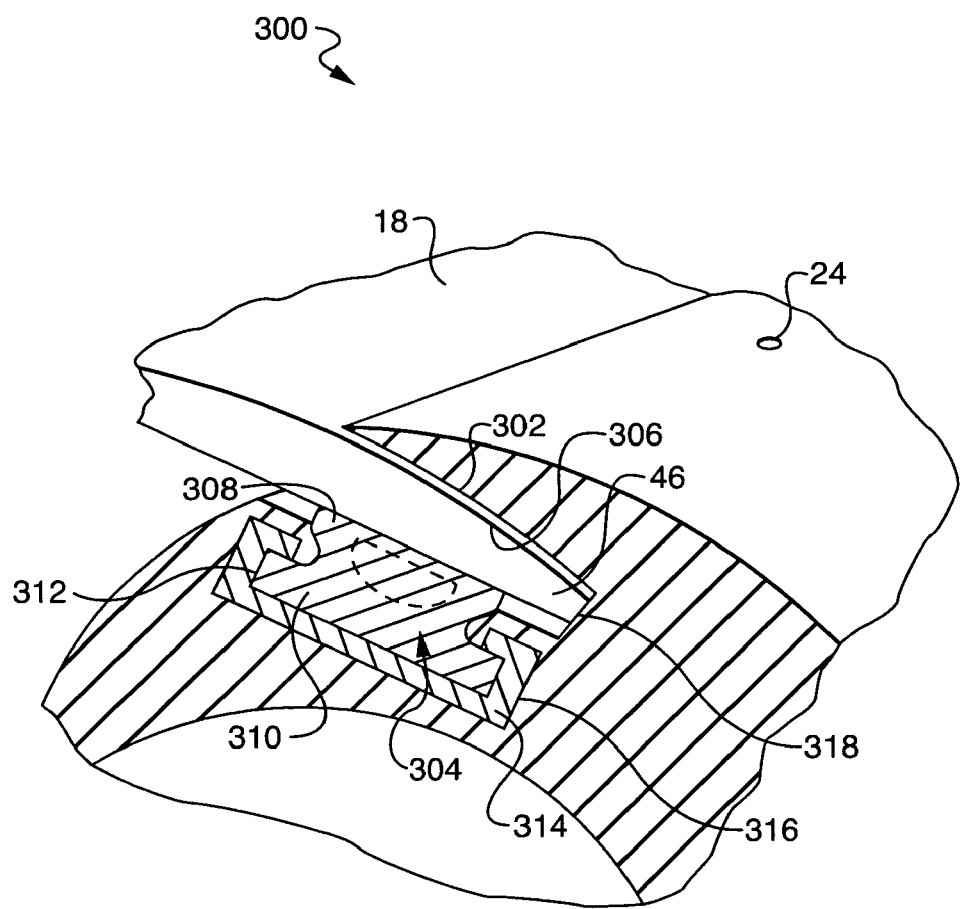
FIG. 8 is a perspective cross-sectional view of a third prior art clamping mechanism.

Another prior art embodiment of clamping mechanism 300 is illustrated in FIG. 8. The leading edge clamping mechanism 300 includes a groove 302 for receiving the leading edge 46 of a printing plate 18 and an inflatable seal clamp 304 for clamping the leading edge 46 of the printing plate 18 against a side 306 of the groove 302. As with the leading edge clamping mechanisms 100, 200, the leading edge clamping mechanism 300 extends across a substantial portion of the width of the external drum 24.

The inflatable seal clamp 304 includes an inflatable portion 308 and a base portion 310. The base portion 310 is mounted within a slot 312 formed in a bar 314. The bar 314 is positioned within a groove 316 that has been formed (e.g., machined) in the external drum 24.

The inflatable seal clamp 304 is normally in a deflated (i.e., "retracted") state. This allows the leading edge 46 of the printing plate 18 to be displaced into, or removed from, the groove 302 of the leading edge clamping mechanism 300 without contacting the inflatable seal clamp 304. The rear wall 318 of the groove 302 is used to register the printing plate 18 on the external drum 24 for clamping and subsequent imaging. With the printing plate 18 properly engaged within the groove 302, the inflatable portion 308 of the inflatable seal clamp 304 is inflated (e.g., using a compressed air source 126). This clamps the leading edge 46 of the printing plate 18 against the side 306 of the groove 302. Because an inflatable seal clamp 304 is used to apply the clamping force against the printing plate 18, the leading edge clamping mechanism 300 self-adjusts for plate thickness.

The force applied against the leading edge 46 of the printing plate 18 by inflatable seal clamp 304 must be sufficient to hold the leading edge 46 in position within the groove 302 as the external drum 24 is rotated at high speed during imaging. As described with regard to the leading edge clamping mechanisms 100, 200, the magnitude of this force is application specific.

It has been discovered that the clamping mechanism 100 of FIGS. 4 and 5 (as disclosed in U.S. Pat. No. 6,705,226) has a major drawback. When the bladder 118 is deflated to cause the clamping portion 104 to clamp down on the plate in the direction C (FIG. 5), the plate 18 shifts slightly in the direction E away from the registration pin 138. This movement results in misalignment of the plate 18 along the external drum 24.

Figure 9:
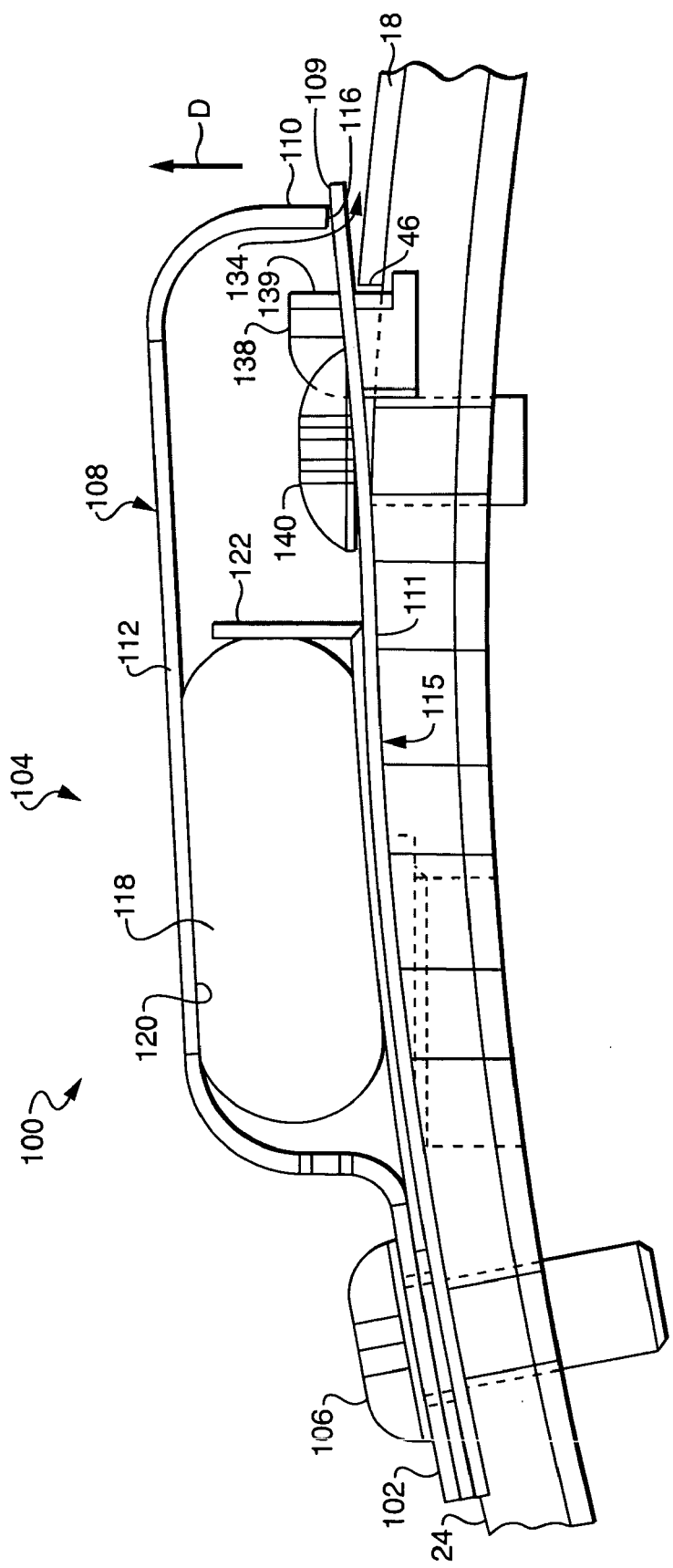
FIG. 9 is a cross-sectional side view of a plate clamping mechanism in a plate release position, in accordance with the principles of the invention.
Figure 10:
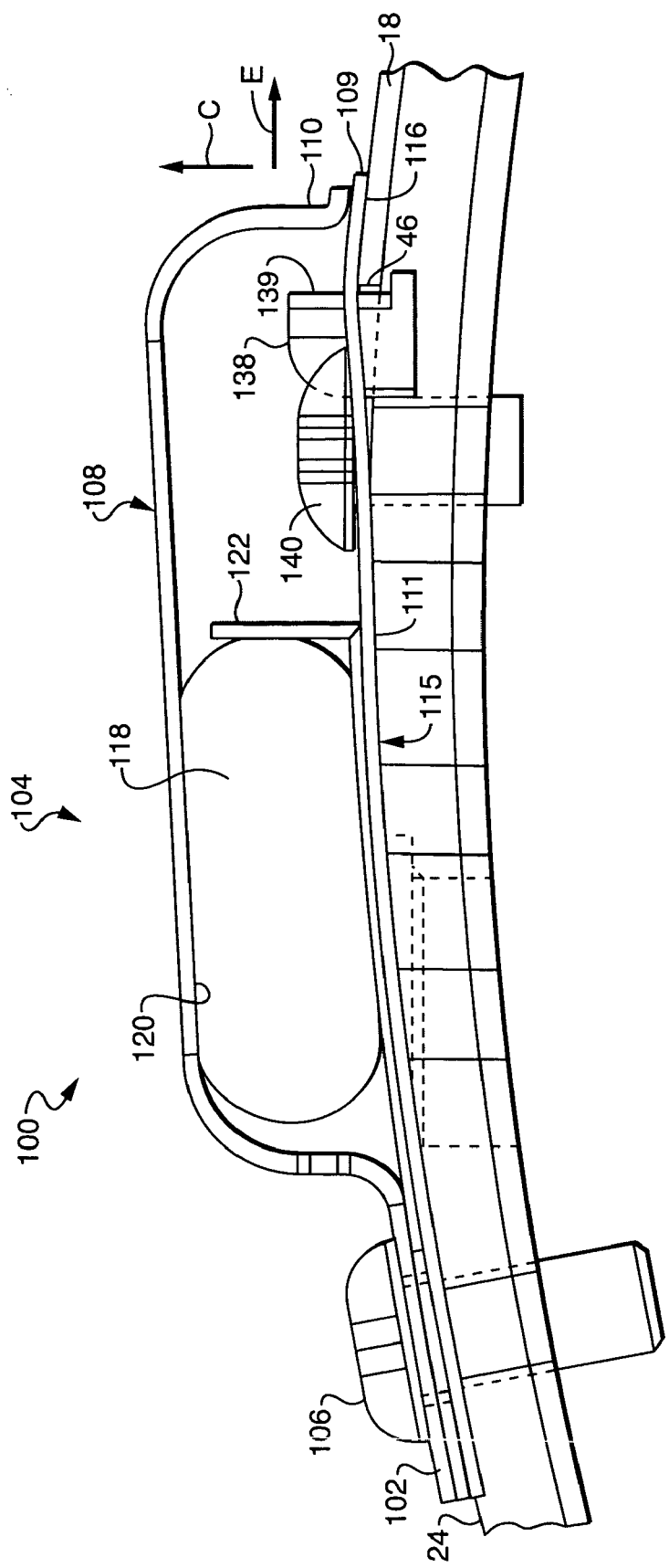
FIG. 10 is a cross-sectional side view of the plate clamping mechanism of FIG. 9 in a plate clamping position, in accordance with the principles of the invention.
Figure 11:
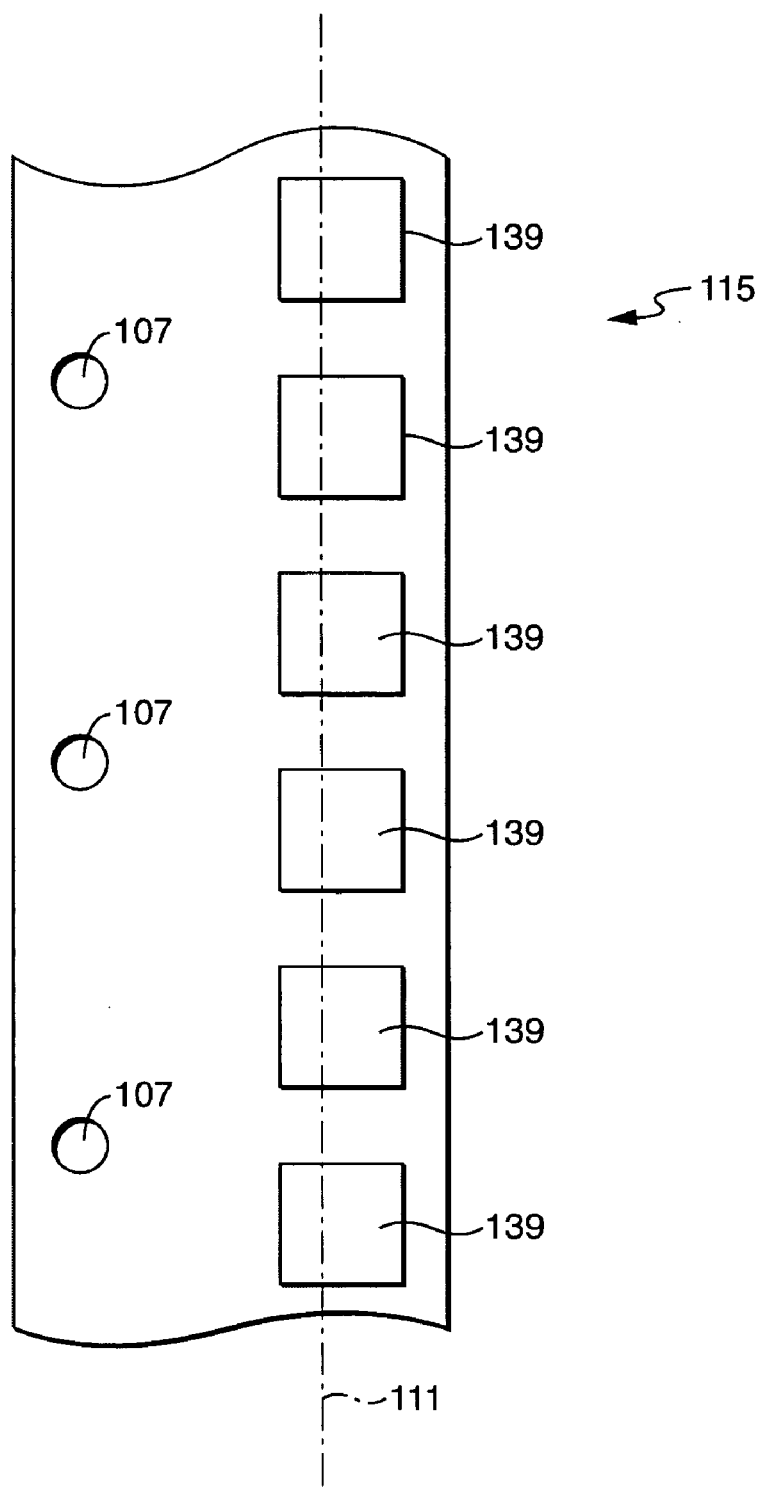
FIG. 11 is a partial top plane view of a first spring-metal component of the clamping mechanism of FIG. 9.

The present invention as illustrated in FIGS. 9 and 10 overcomes this shortcoming to prevent movement of the plate 18 during clamping. The clamping mechanism 100 is modified to include a device to prevent movement of the printing plate 18 during clamping of an end of the plate 18 to the external drum 24. The movement prevention device includes a first spring-metal component 115 which is mounted through holes 107 (FIG. 11) by bolts 106 onto the external drum 24. FIG. 9 illustrates the first spring-metal component 115 securely mounted between the surface of the external drum 24 and the mounting portion 102 of the clamping mechanism 100.

When the bladder 118 is deflated, the plate 18 is released from clamping as illustrated in FIG. 9. The first spring-metal component 115 is securely fastened to the surface of the external drum 24 up to the pivot point 111 located below the support wall 122. The registration pins 138 and bolts 140 are located within the cut-out areas 139 of the firsts spring-metal component 115 (FIG. 11) so that the end section 109 of the first spring-metal component 115 naturally springs to the position shown in FIG. 9, creating a space 134 between the external drum 24 and the end section 109 of the first spring-metal component 115. The space 134 allows placement of a printing plate 18 adjacent to the registration surface 139 of the registration pin 138.

When the bladder 118 is inflated as illustrated in FIG. 10, the distal end 110 of the clamping portion 104 of the clamping apparatus 100 is moved in the direction C to engage the end section 109 of the first spring-metal component 115 which in turn engages the plate 18 to clamp the plate 18 onto the external drum 24. Note that point 111 acts as a pivot point in relation to the end section 109 of the first spring-metal component 115. When the distal end 110 of the clamp 100 moves in the direction E during clamping, it will do so by sliding along the planar top surface of the end section 109 of the first spring-metal component 115, without causing any movement of the plate 18. Since the first spring-metal component 115 is secured to the external drum by bolts 106, the first spring-metal component 115 will not move in the direction E during clamping. Moreover, first spring-metal component 115 acts as a buffer to prevent the movement of the distal end 110 of the clamping mechanism 100 directly on the plate 18. The distal end 110 of the clamping mechanism 100 can alternately be shaped as illustrated in FIG. 9 or 10.

The foregoing description of the present invention has been presented for purposes of illustration and description. It, is not intended to be exhaustive or to limit the invention to the precise form disclosed, and many modifications and variations are possible in light of the above teaching. Such modifications and variations that may be apparent to a person skilled in the art are intended to be included within the scope of this invention.

I claim:

1. A device to prevent movement of a printing plate during clamping of an end of the plate to an external drum of an imaging system using a clamping apparatus having: a clamping portion disposed on the external drum, wherein the clamping portion may be selectively displaced between a clamping position for clamping the leading edge of the printing plate against the external drum and a release position; and an inflatable member positioned between the clamping portion and the external drum for displacing the clamping portion between the clamping position and the release position, said device comprising:

a first spring-metal component mounted onto the external drum wherein the end of the plate can be positioned between one end of the first spring-metal component and the external drum, and the first spring-metal component is positioned between the clamping portion and the plate, to prevent the plate from moving during clamping.

2. A method to prevent movement of a printing plate during clamping of an end of the plate to an external drum of an imaging system using a clamping apparatus having: a clamping portion disposed on the external drum, wherein the clamping portion may be selectively displaced between a clamping position for clamping the leading edge of the printing plate against the external drum and a release position; and an inflatable member positioned between the clamping portion and the external drum for displacing the clamping portion between the clamping position and the release position, said method comprising the steps of:

positioning the end of the plate between the external drum and one end of a first spring-metal component mounted on the external drum, said first spring-metal component being positioned between the plate and the clamping portion;

selectively displacing the clamping portion between a clamping position for clamping an edge of the printing plate against the external drum and a release position; and displacing the clamping portion between the clamping position and the release position using an inflatable member positioned between the clamping portion and the external drum.

* * * * *